(12) United States Patent
Jo

(10) Patent No.: US 9,409,593 B2
(45) Date of Patent: Aug. 9, 2016

(54) RACK TYPE ELECTRIC POWER STEERING APPARATUS

(71) Applicant: MANDO CORPORATION, Pyeongtaek-si, Gyeonggi-do (KR)

(72) Inventor: Hee Kwon Jo, Yongin-si (KR)

(73) Assignee: MANDO CORPORATION, Pyeongtaek-si (KR)

( * ) Notice: Subject to any disclaimer, the term of this patent is extended or adjusted under 35 U.S.C. 154(b) by 0 days.

(21) Appl. No.: 14/992,004

(22) Filed: Jan. 10, 2016

(65) Prior Publication Data

US 2016/0200350 A1 Jul. 14, 2016

(30) Foreign Application Priority Data

Jan. 12, 2015 (KR) .................... 10-2015-0004007

(51) Int. Cl.
*B62D 5/04* (2006.01)
*B62D 3/12* (2006.01)

(52) U.S. Cl.
CPC ............... *B62D 5/0403* (2013.01); *B62D 3/12* (2013.01); *B62D 5/0424* (2013.01)

(58) Field of Classification Search
CPC ............................... B62D 5/0403; B62D 5/04
USPC ......................................... 180/444; 474/101
See application file for complete search history.

(56) References Cited

U.S. PATENT DOCUMENTS

| | | | | |
|---|---|---|---|---|
| 7,191,866 B2* | 3/2007 | Sasaki | ............... | B62D 5/0424 180/443 |
| 7,637,348 B2* | 12/2009 | Namgung | ............ | B62D 5/0424 180/402 |
| 8,950,543 B2* | 2/2015 | Heo | .................. | B62D 5/04 180/444 |
| 2003/0221896 A1* | 12/2003 | Sasaki | ................. | B62D 5/0424 180/444 |
| 2004/0043854 A1* | 3/2004 | Fraley, Jr. | ............ | B62D 5/0424 474/134 |
| 2005/0079939 A1* | 4/2005 | Simmons | .................. | F16H 7/14 474/113 |
| 2007/0129192 A1* | 6/2007 | Song | .................... | B62D 5/0424 474/148 |

* cited by examiner

*Primary Examiner* — Tony Winner
(74) *Attorney, Agent, or Firm* — Hauptman Ham, LLP

(57) ABSTRACT

A power steering system having the tensional force of a belt becomes higher as the distance between a motor shaft and a rack bar becomes larger because a second inclined portion of a support body passing through a guide hole is moved upwards along a first inclined portion to be inserted into a coupling recess, and accordingly, noise and damage to the belt can be prevented. If the support body is inserted into the coupling recess by a third inclined portion of a coupling recess and a motor housing is moved upwards, the tensional force of the belt becomes higher as the distance between the motor shaft and the rack bar becomes larger and, accordingly, noise and damage to the belt can be prevented.

10 Claims, 9 Drawing Sheets

RACK TYPE ELECTRIC POWER STEERING APPARATUS

CROSS-REFERENCE TO RELATED APPLICATION

This application claims priority from and the benefit under 35 U.S.C. §119(a) of Korean Patent Application No. 10-2015-0004007, filed on Jan. 12, 2015, which is hereby incorporated by reference for all purposes as if fully set forth herein.

BACKGROUND OF THE INVENTION

1. Field of the Invention

The present invention relates to a rack type electric power steering apparatus. More particularly, it relates to a rack type electric power steering apparatus in which the tensional force of a belt becomes higher as the distance between a motor shaft and a rack bar becomes larger because a second inclined portion of a support body passing through a guide hole is moved upwards along a first inclined portion to be inserted into a coupling recess, and accordingly, noise and damage to the belt can be prevented. Further, if the support body is inserted into a coupling recess by a third inclined portion of a coupling recess and a motor housing is moved upwards, the tensional force of the belt becomes higher as the distance between the motor shaft and the rack bar becomes larger, and accordingly, noise and damage to the belt can be prevented.

2. Description of the Prior Art

In general, a steering apparatus refers an apparatus that allows the driver to rotate a steering wheel to freely change the direction of travel of a vehicle, and is an apparatus that arbitrarily changes the center of rotation about which the front wheels are pivoted to help the driver drive the vehicle in a desired direction.

FIG. 1 is a partially sectional view of a rack type electric power steering apparatus according to the related art.

As illustrated in FIG. 1, the rack type electric steering apparatus, according to the related art, includes a rack bar 109 that extends in a transverse direction of a vehicle and has a rack gear part on one side of an outer peripheral surface thereof, a pinion shaft 104 that has a pinion gear part that is engaged with the rack gear part, a ball screw part 150 that has balls 201, a ball screw 203, and a ball nut 205 engaged with the ball screw 203 via the balls 201, a belt type transmission unit 140 that connects the ball nut 205 and a motor shaft 221, a motor 130, and a motor housing 240 that is fixed to a rack housing 223 through bolt coupling while surrounding the motor 130.

The pinion shaft 104 is connected to a steering wheel through a steering shaft, and the rack bar 109 that has a screw of a predetermined length on one side of an outer surface thereof is installed within the rack housing 223.

The ball screw part 150 includes a ball nut 205, which is coaxially formed with the rack bar 109 and surrounds the rack bar 109, and the balls 201 that make contact with the ball screw 203 formed on the outer surface of the rack bar 109.

The ball nut 205 is rotated together with the motor shaft 221 as the motor shaft 221 is rotated, and a bearing 207 is provided between an outer peripheral surface of the ball nut 205 and an inner peripheral surface of the rack housing 223 for the smooth rotation of the ball nut 205.

The belt type transmission unit 140 includes a belt 230 that connects the motor shaft 221 and the ball nut 205, and transmits auxiliary power that is generated by the motor 130 to the rack bar 109 through the ball nut 205 in proportion to a steering torque applied to the steering wheel.

That is, as the motor shaft 221 is rotated, the ball nut 205, which received a rotational force of the motor shaft 221 through the belt 230, is also rotated, and as the ball nut 205 is rotated, the rack bar 109 is axially linearly moved according to the movements of the balls 201 and the ball screw 203.

FIG. 2 is a side view of a motor housing and a rack housing of the rack type electric power steering apparatus according to the related art.

The motor 130 is fixed by coupling the motor housing 240 surrounding the motor 130 and the rack housing 223 by means of bolts 270.

If the motor shaft 221 drives the belt 230 while being rotated to rotate the ball nut 205 during a steering operation, a force that pulls the motor shaft 221 and a shaft of the rack bar 109 including the ball nut 205 towards each other is applied by a tensional force of the belt 230.

Because the generated force is concentrated on a coupling portion of the bolts of the motor housing 240 and the rack housing 223, which is most mechanically vulnerable, and the motor shaft 221 is moved towards the rack bar 109 that includes the ball nut 205 by a phenomenon in which the bolts 300 are released due to vibration and an impact occurring while the motor shaft 221 is rotated during a steering operation, the tensional force of the belt 230 decreases, noise occurs between the belt 230 and a driving pulley 280 or a driven pulley 290, and the belt 230 is damaged.

SUMMARY OF THE INVENTION

The present invention has been made in an effort to solve the above-mentioned problems, and provides a rack type electric power steering apparatus in which the tensional force of a belt becomes higher as the distance between a motor shaft and a rack bar becomes larger because a second inclined portion of a support body passing through a guide hole is moved upwards along a first inclined portion to be inserted into a coupling recess, and accordingly, noise and damage to the belt can be prevented. Also, if the support body is inserted into a coupling recess by a third inclined portion of a coupling recess and a motor housing is moved upwards, the tensional force of the belt becomes higher as the distance between the motor shaft and the rack bar becomes larger and, accordingly, noise and damage to the belt can be prevented.

In order to achieve the object, there is provided a rack type electric power steering apparatus including: a rack housing that surrounds a rack bar coupled to a driven pulley, has a through-hole through which a motor shaft of a motor coupled to a driving pulley passes, has a guide hole that is spaced apart from the through-hole, and has a first inclined portion of which a cross-section in a direction in which the motor is coupled is changed; a motor housing to which the rack housing is coupled, on which the motor is mounted such that the motor shaft passes through the through-hole, and which has a coupling recess at a location corresponding to the guide hole; and a support body that passes through the guide hole to be coupled to the coupling recess and has a second inclined portion corresponding to the first inclined portion such that the driving pulley is moved away from the driven pulley when being coupled.

As described above, according to the present invention, because the second inclined portion of the support body passing through the guide hole is moved upwards along the first inclined portion to be inserted, the tensional force of the belt becomes higher as the distance between the motor shaft and the rack bar becomes larger, and accordingly, noise and damage to the belt can be prevented.

Furthermore, if the support body is inserted by the third inclined portion of the coupling recess and the motor housing is moved upwards, the tensional force of the belt becomes higher as the distance between the motor shaft and the rack bar becomes larger and, accordingly, noise and damage to the belt can be prevented.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE EXEMPLARY EMBODIMENTS

Hereinafter, exemplary embodiments of the present invention will be described in detail with reference to the accompanying drawings. In the description of the elements of the present invention, terms "first", "second", "A", "B", "(a)", "(b)" and the like may be used. These terms are merely used to distinguish one structural element from other structural elements, and a property, an order, a sequence and the like of a corresponding structural element are not limited by the term. It should be noted that if it is described in the specification that one component is "connected," "coupled" or "joined" to another component, a third component may be "connected," "coupled," and "joined" between the first and second components, although the first component may be directly connected, coupled or joined to the second component.

Figure 4:
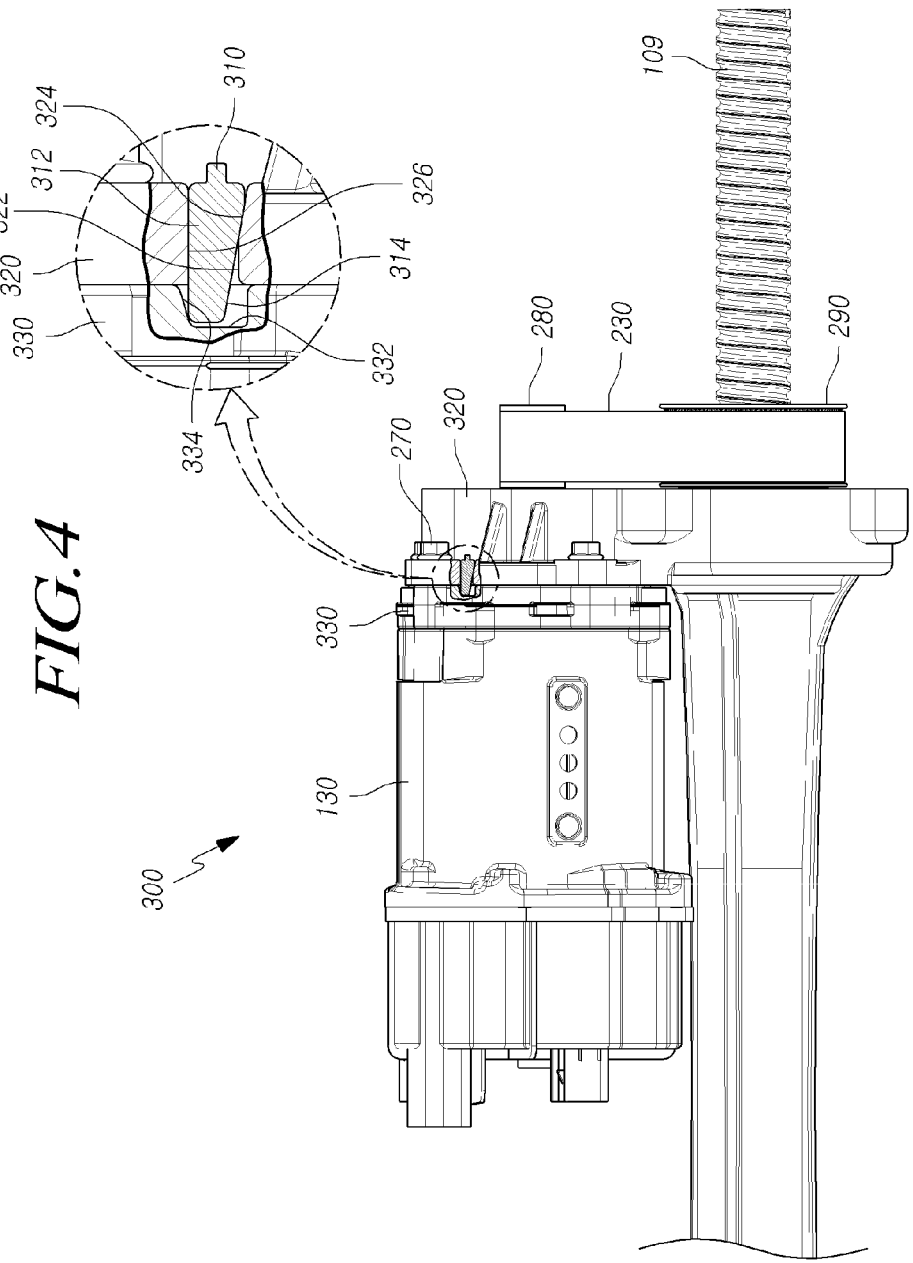
FIG. 4 is a front view of the motor housing and the rack housing of the rack type electric power steering apparatus according to the first embodiment of the present invention.

Unless otherwise mentioned in the detailed description of the present invention, the upper side of FIG. 4 will be described as an upper side, the lower side of FIG. 4 will be described as a lower side, the left side of FIG. 4 will be described as one side, and the right side of FIG. 4 will be described as an opposite side for the convenience of description.

Figure 1:
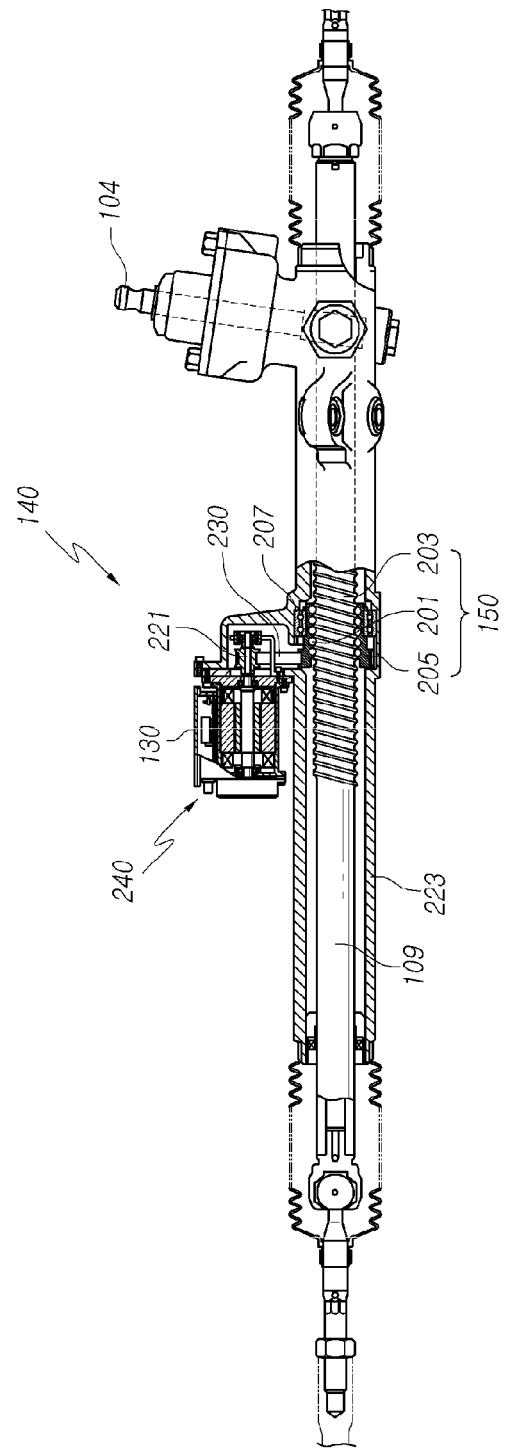
FIG. 1 is a partially sectional view of a rack type electric power steering apparatus according to the related art.
Figure 2:
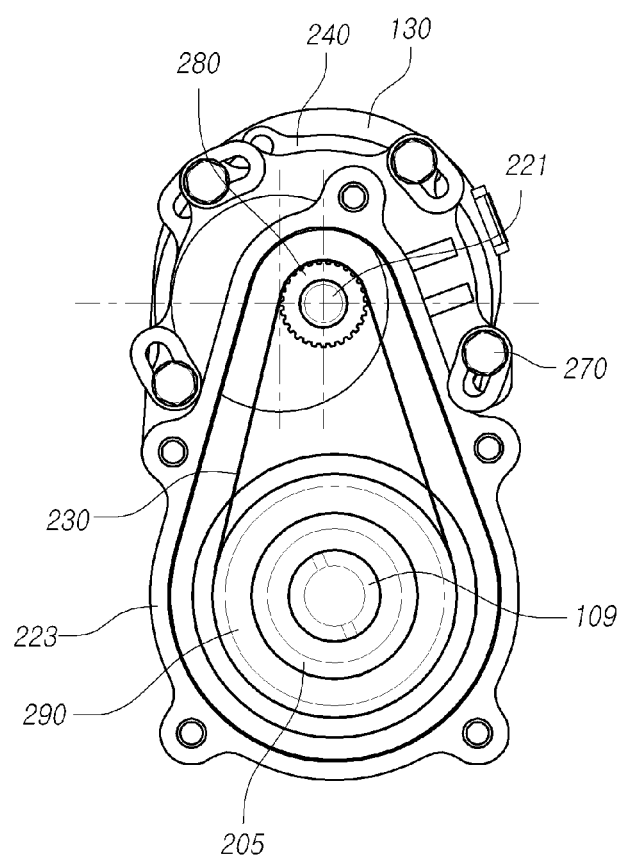
FIG. 2 is a side view of a motor housing and a rack housing of a rack type electric power steering apparatus according to the related art.
Figure 3:
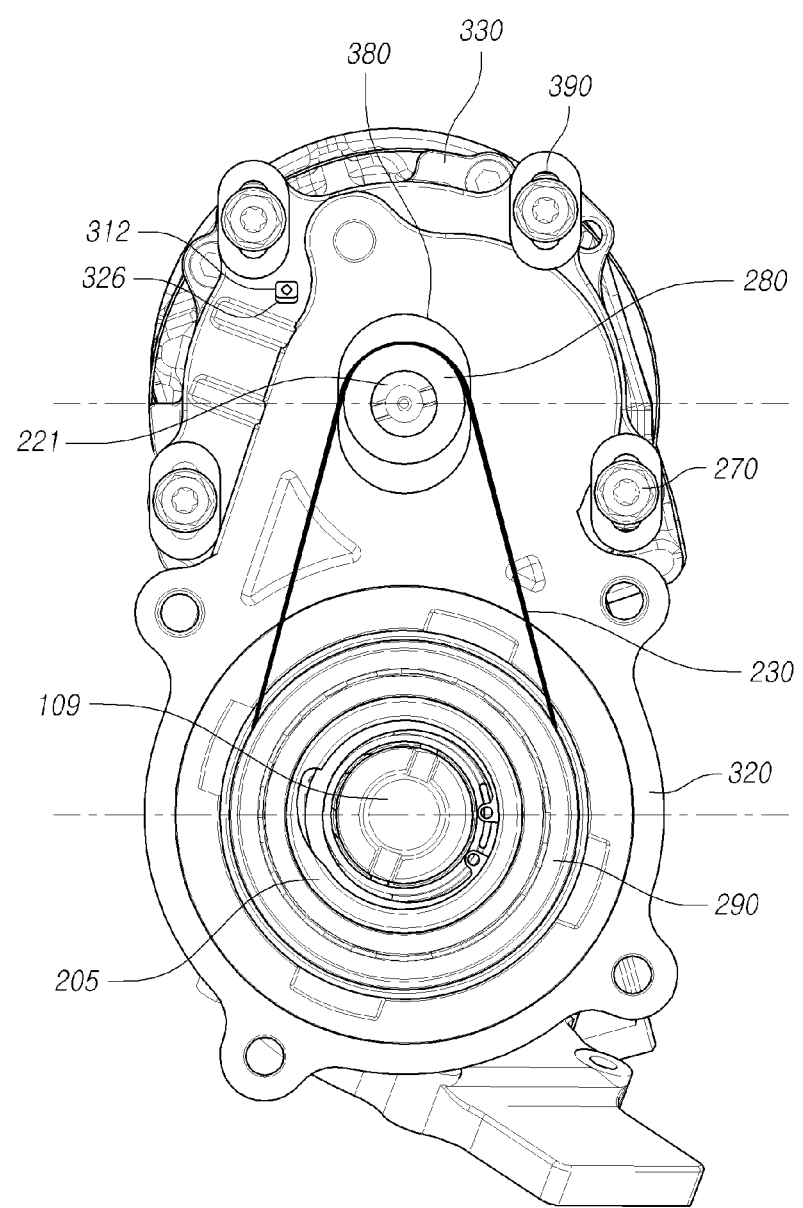
FIG. 3 is a side view of a motor housing and a rack housing of a rack type electric power steering apparatus according to a first embodiment of the present invention.
Figure 5:
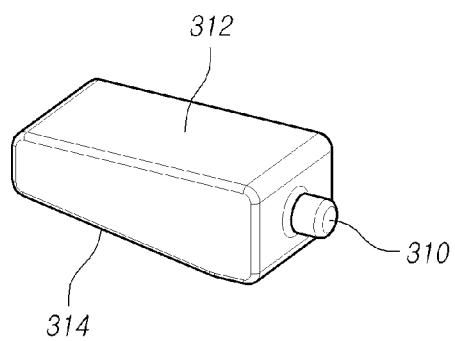
FIG. 5 is a perspective view illustrating a support body of the rack type electric power steering apparatus according to the first embodiment of the present invention.
Figure 6:
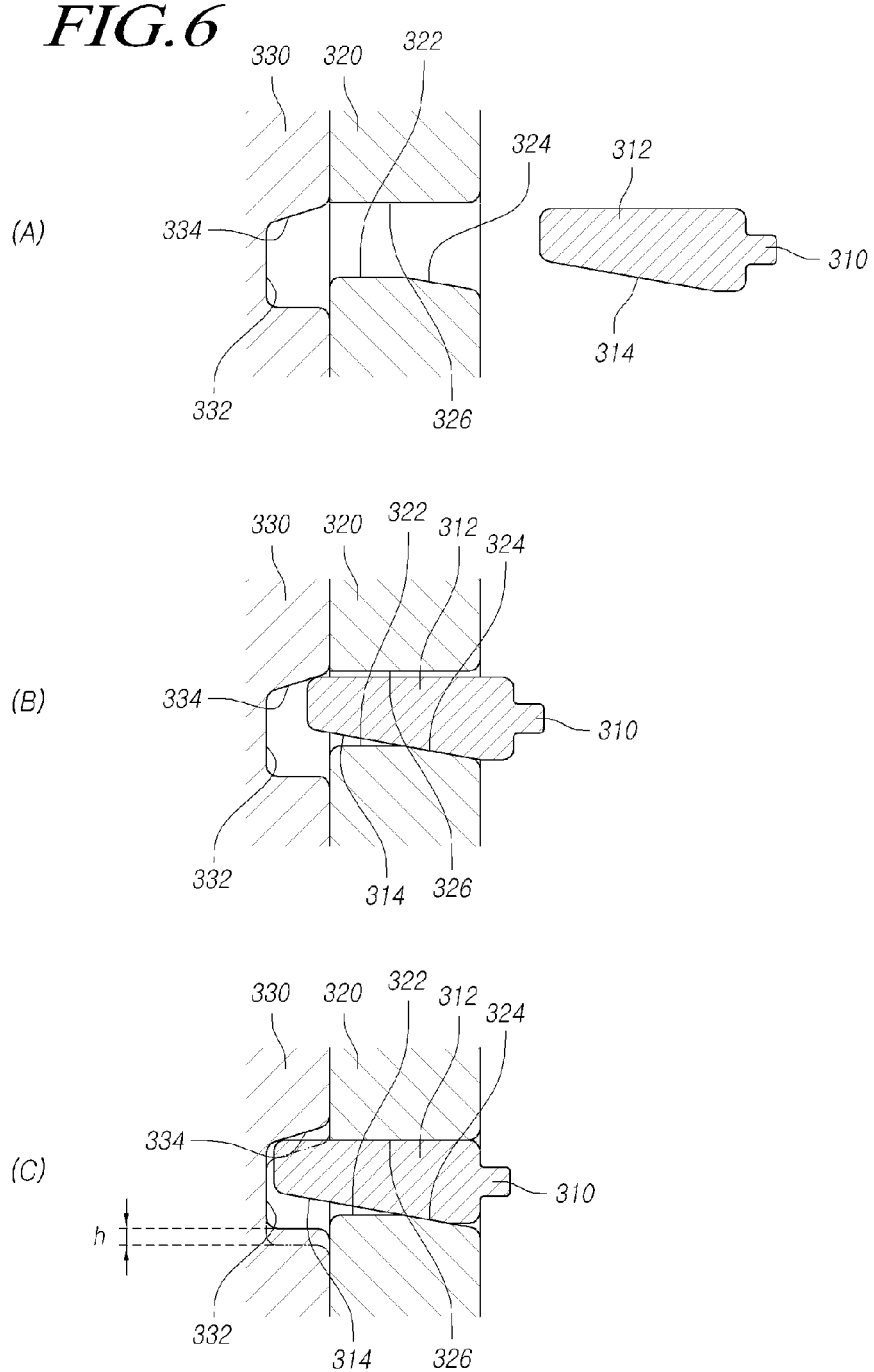
FIG. 6 is a partially sectional view illustrating a process of coupling the support body to the rack housing and the motor housing in the rack type electric power steering apparatus according to the first embodiment of the present invention.
Figure 7:
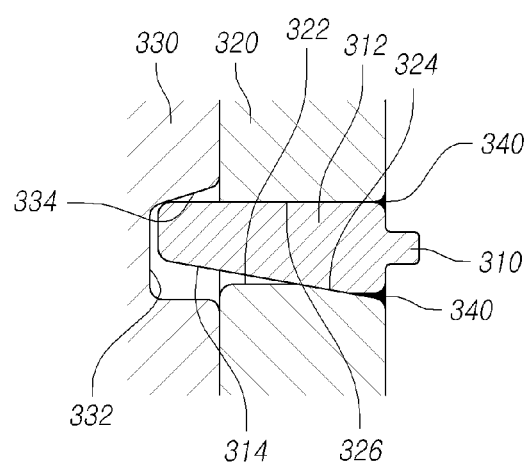
FIG. 7 is a partially sectional view illustrating a state in which the support body is coupled to the rack housing and the motor housing according to the first embodiment of the present invention.

FIG. 3 is a side view of a motor housing and a rack housing of a rack type electric power steering apparatus according to a first embodiment of the present invention. FIG. 4 is a front view of the motor housing and the rack housing of the rack type electric power steering apparatus according to the first embodiment of the present invention. FIG. 5 is a perspective view illustrating a support body of the rack type electric power steering apparatus according to the first embodiment of the present invention. FIG. 6 is a partially sectional view illustrating a process of coupling the support body to the rack housing and the motor housing in the rack type electric power steering apparatus according to the first embodiment of the present invention. FIG. 7 is a partially sectional view illustrating a state in which the support body is coupled to the rack housing and the motor housing according to the first embodiment of the present invention.

Referring to FIGS. 3 to 7, in a detailed description of a feature structure of the first embodiment of the present invention, the rack type electric power steering apparatus, according to the first embodiment of the present invention, includes a rack housing 320 that surrounds a rack bar 109 coupled to a driven pulley 290, has a through-hole 380 through which a motor shaft 221 of a motor 130 coupled to a driving pulley 280 passes in an axial direction of the rack bar 109, and has a guide hole 326 that is spaced apart from the through-hole 380, extending in the axial direction of the rack bar 109, and having a first inclined portion 324 of which a cross-section is changed such that a vertical width thereof in a direction in which a motor 130 is coupled becomes narrower, a motor housing 330 to which the rack housing 320 is coupled, on which the motor 130 is mounted such that the motor shaft 221 passes through the through-hole 380, and which has a coupling recess 332 at a location corresponding to the guide hole 326, and a support body 312 that passes through the guide hole 326 to be coupled to the coupling recess 332 and has a second inclined portion 314 corresponding to the first inclined portion 324 such that the driving pulley 280 is moved away from the driven pulley 290 when being coupled.

A belt type transmission unit 300 includes a driving pulley 280 that is coupled to the motor shaft 221, a driven pulley 290 that is coupled to a ball nut 205, and a belt 230 that connects the driving pulley 280 and the driven pulley 290, and auxiliary power that is generated by the motor 130 in proportion to a steering torque applied to a steering wheel is transmitted to the rack bar 109 through the ball nut 205.

That is, the ball nut 205 that received a rotational force of the motor shaft 221 is also rotated by the belt 230 as the motor shaft 221 is rotated, and the rack bar 109 is axially linearly moved by balls and a ball screw as the ball nut 205 is rotated.

The rack housing 320 surrounds the rack bar 109 to which the driven pulley 290 is coupled, has a through-hole 380 through which the motor shaft 221 of the motor 130 to which the driving pulley 280 is coupled passes in the axial direction of the rack bar 109, and has a guide hole 326 spaced apart from the through-hole 380, extending in the axial direction of the rack bar 109, and having a first inclined portion 324 of which a cross-section is changed such that a vertical width thereof in a direction in which a motor 130 is coupled becomes narrower.

Here, the through-hole 380 may be a slot such that a portion of the motor housing 330 is inserted into the slot and the motor shaft 221 is moved upwards and downwards.

The guide hole 326 has a first flat portion 322 extending from the first inclined portion 324 and having a constant vertical width in a direction in which the motor 130 is coupled.

That is, the guide hole 326 has a first flat portion 322 that has a constant vertical width on one side on which the motor 130 is coupled, and a first inclined portion 324 of which a vertical width becomes wider as it goes from the first flat portion 322 to an opposite side.

The guide hole 326 has the first inclined portion 324 on any one of the upper surface and the lower surface thereof, and a support body 312 that has a second inclined portion 314 corresponding to the first inclined portion 324 on any one of the upper surface and the lower surface thereof such that the support body 312 to correspond to the guide hole 326 is coupled to the guide hole 326.

In the first embodiment of the present invention, because the first inclined portion 324 is formed on the lower surface of the guide hole 326 and the second inclined portion 314 is formed on the lower surface of the support body 312 such that the second inclined portion 314 of the support body 312 passing through the guide hole 326 is moved upwards along the first inclined portion 324 of the guide hole 326 to be inserted into the coupling recess 332, the motor housing 330 is moved upwards such that the distance between the motor shaft 221 and the rack bar 109 becomes larger, increasing the tensional force of the belt 230 and, accordingly, preventing noise and damage to the belt 230.

The motor 130 is coupled to the motor housing 330 surrounding the motor 130 by bolts.

The motor housing 330 is coupled to the rack housing 320 such that the motor 130 is mounted on the motor housing 330 and the motor shaft 221 passes through the through-hole 380, and the coupling recess 332 is formed at a location corresponding to the guide hole 326.

One or more slots 390 are formed in the rack housing 320 such that the driving pulley 280 that is coupled to the motor shaft 221 is moved away from the driven pulley 290 that is coupled to the rack bar 109 and one or more screw holes are formed in the motor housing 330 so that the tensional force of the belt 230 is adjusted by preliminarily coupling the bolts 270 to the screw holes after passing the bolts 270 through the slots 390 and moving the motor housing 330 upwards and downwards, and the motor housing 330 is fixed to the rack housing 320 by fastening the bolts 270 in the state in which the tensional force of the belt 230 is adjusted.

The coupling recess 332 has a third inclined portion 334 on the upper surface thereof such that a vertical width thereof becomes narrower as it goes towards a side on which the motor 130 is coupled.

Accordingly, if the support body 312 is inserted into the coupling recess 332 by the third inclined portion 334 of the coupling recess 332 and the motor housing 330 is moved upwards at the same time, the distance between the motor shaft 221 and the rack bar 109 becomes larger, increasing the tensional force of the belt 230 and, accordingly, preventing noise and damage to the belt 230.

When the support body 312 passes through the guide hole 326 and is coupled to the coupling recess 332, the second inclined portion 314 corresponding to the first inclined portion 324 is formed such that driving pulley 280 is moved away from the driven pulley 290.

That is, the support body 312 has the second inclined portion 314 corresponding to the first inclined portion 324 of the guide hole 326 on any one of the upper surface and the lower surface thereof.

In addition, the support body 312 has a knob 310 that protrudes from an end in a direction in which a vertical width thereof becomes larger in an axial direction of the rack bar 109.

In the rack type electric power steering apparatus, according to the first embodiment of the present invention, if the motor housing 330 is preliminarily coupled to the rack housing 320 as illustrated in FIG. 6A and then the support body 312 is inserted into the guide hole 326 of the rack housing 320 as illustrated in FIG. 6B, the support body 312 having the second inclined portion 314 pushes the motor housing 330 upwards along the first inclined portion 324 of the rack housing 320 to be inserted into the guide hole 326.

As illustrated in FIG. 6C, when the support body 312 is inserted and the motor housing 330 is moved upwards by the third inclined portion 334 of the motor housing 330 at the same time, and the tensional force of the belt 230 is increased in proportion to the distance h by which the motor housing 330 is moved along the inclined portion.

Accordingly, because the second inclined portion 314 of the support body 312 passing through the guide hole 326 is moved upwards along the first inclined portion 324 of the guide hole 326 and is inserted into the coupling recess 332, the motor housing 330 is moved upwards and the distance between the motor shaft 221 and the rack bar 109 becomes larger, increasing the tensional force of the belt 230 and, accordingly, preventing noise and damage to the belt 230.

If the support body 312 is inserted into the coupling recess 332 by the third inclined portion 334 of the coupling recess 332 and the motor housing 330 is moved upwards at the same time, the tensional force of the belt 230 increases as the distance between the motor shaft 221 and the rack bar 109 increases and, accordingly, noise and damage to the belt 230 can be prevented.

Here, as illustrated in FIG. 7, the inserted support body 312 may be fixed to the rack housing 320 through a fixing method such as bonding 340, welding, or calking.

Figure 8:
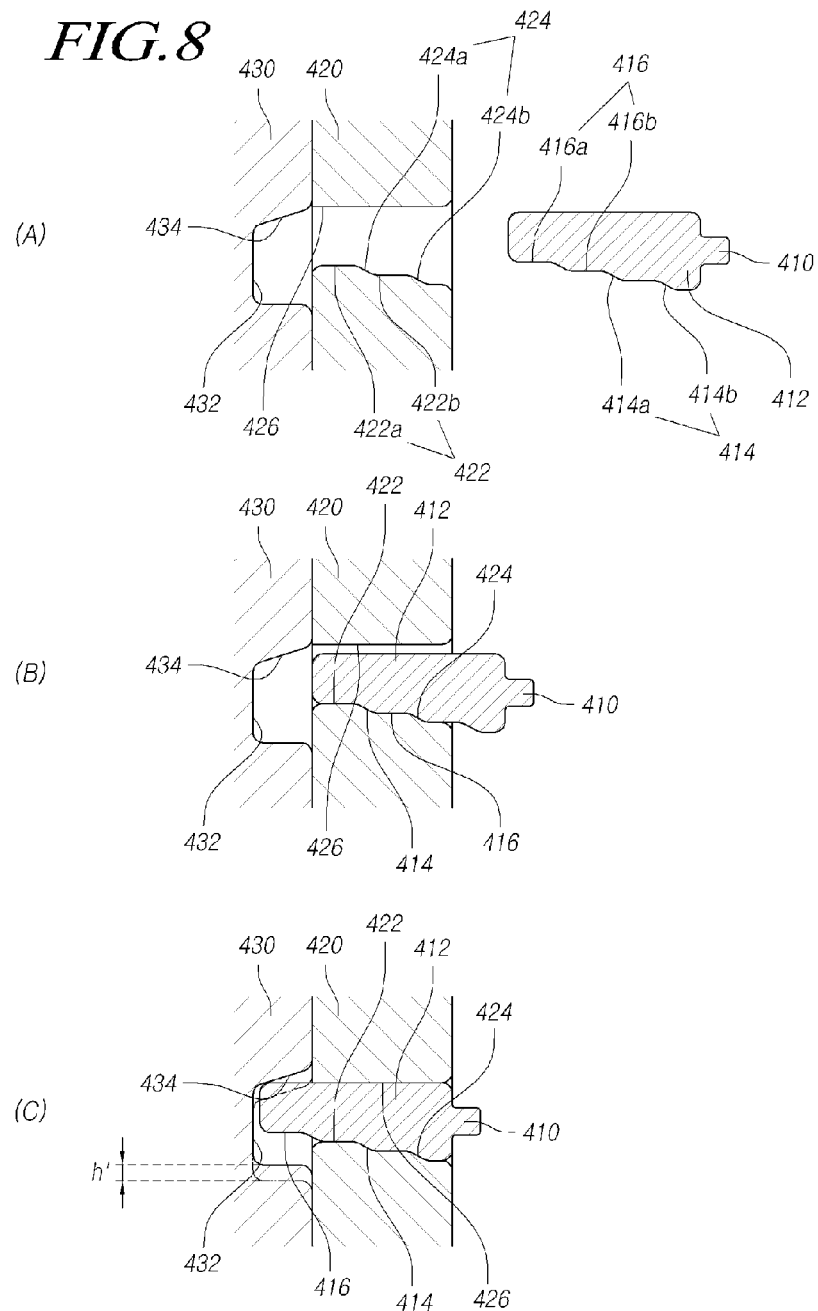
FIG. 8 is a partially sectional view illustrating a process of coupling a support body to a rack housing and a motor housing in a rack type electric power steering apparatus according to a second embodiment of the present invention.

FIG. 8 is a partially sectional view illustrating a process of coupling a support body to a rack housing and a motor housing in a rack type electric power steering apparatus according to a second embodiment of the present invention.

The second embodiment of the present invention is the same as the first embodiment of the present invention except for a guide hole 426 and a support body 412, and thus only the structures and operations of the guide hole 426 and the support body 412 will be described.

As illustrated, in the rack type electric power steering apparatus, according to the second embodiment of the present invention, two or more first inclined portions 424 and two or more first flat portions 422 formed in the guide hole 426 are sequentially repeatedly formed inwards, and the support body 412 is configured such that second inclined portions 414 and second flat portions 416 are sequentially repeatedly formed to correspond to the first inclined portions 424 and the first flat portions 422.

That is, in the guide hole 426, a first flat portion 422a having a constant vertical width is formed on one side in a direction in which the motor 130 is coupled, a first inclined portion 424a is formed such that a vertical width thereof becomes larger as it goes from the first flat portion 422a to an opposite side, and in turn, a first flat portion 422b is formed from the first inclined portion 424a to an opposite side and a first inclined portion 424b is formed from the first flat portion 422b to an opposite side such that a vertical width thereof becomes larger.

In the guide hole 426, according to the embodiment of the present invention, three second inclined portions 314 and three first flat portions 422 are sequentially repeatedly formed, and also in the support body 412 corresponding to the guide hole 426, three second inclined portions 414 and three second flat portions 416 are sequentially repeatedly formed.

That is, in the support body 412, a second flat portion 416a having a constant vertical width is formed on one side in a direction in which the motor 130 is coupled, a second inclined portion 414a is formed such that a vertical width thereof becomes larger as it goes from the second flat portion 416a to an opposite side, and in turn, a second flat portion 416b is formed from the second inclined portion 414a to an opposite side and a second inclined portion 414b is formed such that a vertical width thereof becomes larger from the second flat portion 416b to an opposite side.

In the guide hole 426 and the support body 412 formed in this way, because the inclined portions 414 and 424 and the flat portions 416 and 422 are repeatedly formed, the tensional force of the belt 230 can be adjusted in stages.

In the rack type electric power steering apparatus, according to the second embodiment of the present invention, if the motor housing 430 is preliminarily coupled to the rack housing 420 as illustrated in FIG. 8A and then the support body 412 is inserted into the guide hole 426 of the rack housing 420 as illustrated in FIG. 8B, the support body 412 having the second inclined portions 414 pushes the motor housing 430 upwards along the first inclined portions 424 of the rack housing 420 to be inserted.

As illustrated in FIG. 8C, the support body 412 is inserted and the motor housing 430 is moved upwards by the third inclined portion 434 of the motor housing 430, and the tensional force of the belt 230 is increased by the distance h by which the motor housing 430 is moved along the inclined portion.

Here, when the tensional force is high, a knob 410 of the support body 412 is pulled to fix the support body 412 to the rack housing 420 such that the upper second inclined portion 414a is situated at the lower first inclined portion 424b and the upper second flat portion 416a is situated at the lower first flat portion 422b.

Figure 9:
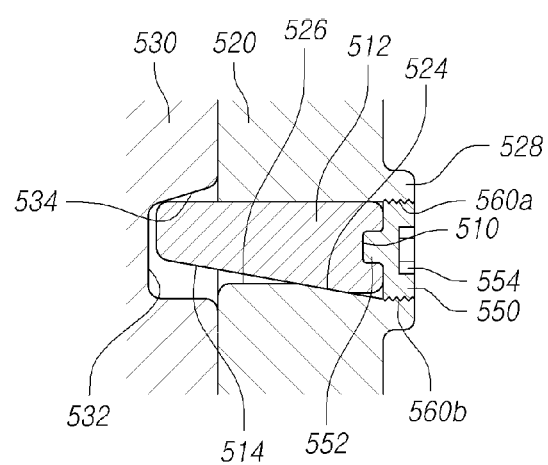
FIG. 9 is a partially sectional view illustrating a state in which a support body is coupled to a rack housing and a motor housing in a rack type electric power steering apparatus according to a third embodiment of the present invention.

FIG. 9 is a partially sectional view illustrating a state in which a support body is coupled to a rack housing and a motor housing in a rack type electric power steering apparatus according to a third embodiment of the present invention.

The third embodiment of the present invention is the same as the first embodiment of the present invention except for a guide hole 526 and a support body 512, and thus, only the structures and operations of the guide hole 526 and the support body 512 will be described.

As illustrated in FIG. 9, the rack type electric power steering apparatus, according to the third embodiment of the present invention, further includes a fixing part 528 that is coupled to, or formed at, an end in a direction in which a vertical width of the guide hole 526 becomes larger, and a plug 550 that is coupled to the fixing part 528 while supporting the support body 512.

That is, the fixing part 528 having a female screw portion 560a is coupled to, or formed at, an end of the guide hole 526 in a direction in which a vertical end thereof becomes larger, and the plug 550 having a male screw portion 560b is coupled to the female portion 560a of the fixing part 528 to support the support body 512.

Alternatively, a male screw portion may be formed in the fixing part 528 and a female screw portion may be formed in the plug 550 so that the plug 550 may be coupled to the fixing part 528 and the plug 550 may be press-fitted with the fixing part 528.

Thereafter, a fixing recess 510 is formed on a surface of the support body 512 that faces the plug 550, and a fixing boss 552 inserted into the fixing recess 510 is formed in the plug 550.

Accordingly, because the fixing boss 552 of the plug 550 is inserted into the fixing recess 510 of the support body 512, the support body 512 is supported by the rack housing 520 without being moved, thereby more firmly supporting the motor housing 530.

Furthermore, because a coupling tool recess 554 is formed on a surface opposite to the surface on which the fixing boss 552 of the plug 550 is formed and a coupling tool is inserted into the coupling tool recess 554 to fix the plug 550, the plug 550 is firmly fixed to the fixing part 528.

As described above, according to the present invention, because the second inclined portion of the support body passing through the guide hole is moved upwards along the first inclined portion to be inserted into the coupling recess, the tensional force of the belt becomes higher as the distance between the motor shaft and the rack bar becomes larger, and accordingly, noise and damage to the belt can be prevented.

Furthermore, if the support body is inserted into the coupling recess by the third inclined portion of the coupling recess and the motor housing is moved upwards, the tensional force of the belt becomes higher as the distance between the motor shaft and the rack bar becomes larger and, accordingly, noise and damage to the belt can be prevented.

Even if it was described above that all of the components of an embodiment of the present invention are coupled as a single unit or coupled to be operated as a single unit, the present invention is not necessarily limited to such an embodiment. That is, at least two elements of all structural elements may be selectively joined and operate without departing from the scope of the present invention. Although a preferred embodiment of the present invention has been described for illustrative purposes, those skilled in the art will appreciate that various modifications, additions and substitutions are possible, without departing from the scope and spirit of the invention as disclosed in the accompanying claims. The scope of the present invention shall be construed on the basis of the accompanying claims in such a manner that all of the technical ideas included within the scope equivalent to the claims belong to the present invention.

What is claimed is:

1. A electric power steering apparatus comprising:
    a rack housing that surrounds a rack bar that is coupled to a driven pulley, has a through-hole through which a motor shaft of a motor coupled to a driving pulley passes, and has a guide hole that is spaced apart from the through-hole, and having a first inclined portion of which a cross-section in a direction in which the motor is coupled is changed;
    a motor housing to which the rack housing is coupled, on which the motor is mounted such that the motor shaft passes through the through-hole, and which has a coupling recess at a location corresponding to the guide hole; and
    a support body that passes through the guide hole to be coupled to the coupling recess and has a second inclined portion corresponding to the first inclined portion such that the driving pulley is moved away from the driven pulley when being coupled.

2. The electric power steering apparatus of claim 1, wherein the through-hole is a slot that extends upwards and downwards such that the motor shaft is moved upwards and downwards.

3. The electric power steering apparatus of claim 1, wherein the guide hole is configured such that a first flat portion having a constant vertical width is formed from the first inclined portion to a side on which the motor is coupled.

4. The electric power steering apparatus of claim 3, wherein two or more first inclined portions and two or more first flat portions formed in the guide hole are sequentially repeatedly formed inwards, and the support body is configured such that second inclined portions and second flat portions are sequentially repeatedly formed to correspond to the first inclined portions and the first flat portions.

5. The electric power steering apparatus of claim 1, wherein the guide hole has the first inclined portion on any one of the upper surface and the lower surface thereof, and a support body that has a second inclined portion corresponding to the first inclined portion on any one of the upper surface and the lower surface thereof such that the support body corresponds to the guide hole.

6. The electric power steering apparatus of claim 1, wherein the coupling recess has a third inclined portion on an upper surface thereof such that a vertical width thereof becomes narrower as it goes towards a side on which the motor is coupled.

7. The electric power steering apparatus of claim 1, further comprising:
a fixing part that is coupled to, or formed at, an end in a direction in which a vertical width of the guide hole becomes larger; and
a plug that is coupled to the fixing part while supporting the support body.

8. The electric power steering apparatus of claim 7, wherein screw parts are formed on an inner peripheral surface of the fixing part and an outer peripheral surface of the plug such that the plug is screw-coupled to the fixing part.

9. The electric power steering apparatus of claim 7, wherein the support body is configured such that a fixing recess is formed on a surface thereof that faces the plug, and a fixing boss inserted into the fixing recess is formed in the plug.

10. The electric power steering apparatus of claim 1, wherein the support body is configured such that a knob protrudes from an end in a direction in which a vertical width thereof becomes larger, in an axial direction of the rack bar.

\* \* \* \* \*